June 4, 1963  R. M. MORGAN  3,092,115
RASP TYPE THRESHING CYLINDER AND ELASTIC CONCAVE ELEMENTS
Filed May 3, 1960

Robert M. Morgan
INVENTOR.

BY Ramsey and Kolisch
Attys.

United States Patent Office 3,092,115
Patented June 4, 1963

3,092,115
RASP TYPE THRESHING CYLINDER AND
ELASTIC CONCAVE ELEMENTS
Robert M. Morgan, McMinnville, Oreg., assignor to R. M.
Morgan Co., Portland, Oreg., a corporation of Oregon
Filed May 3, 1960, Ser. No. 26,535
3 Claims. (Cl. 130—27)

My invention relates generally to grain harvesting and threshing devices and particularly those having cylinders of the rasp-type. Grain threshers having rasping elements arranged in spaced relation about the periphery of a cylinder also have concaves encompassing a portion of the lower portion of the cylinder which together operate upon a stratum or ribbon of grain in pods which flows between them. The compound rotation of the cylinder and a blast of air produced thereby tends to move grain, including seed of legumes being threshed, slowly across the concave so that the rasps upon the cylinder may cut away the pods and free the grain therefrom.

To produce proper motion of the stratum or ribbon of grain between the cupped upper face of the concave and the periphery of the cylinder bearing rasps it is necessary to adjust the concave to the cylinder so that a proper thickness of a stream and grain flows therebetween. In some grains, for example, such a stratum or ribbon of grain flowing between the cylinder and upper face of the concave might be one-half inch in thickness. Generally speaking, the spacing between the peripheral surface of the cylinder and its concave is increased with large grains and decreased for smaller grains. This is for the reason that if too thick a ribbon of grain is being threshed all of the grain pods will not be raked by the rasps and a portion of the grain will be unthreshed. On the other hand, if too thin a ribbon is flowed beneath the cylinder a too severe threshing action results with injury to the grains. Thus, the spacing of the cylinder and its concave is determined by trial and error.

It has been my observation that threshers having cylinders of the rasp-type are more difficult to set when threshing small grains, such for example, as grass seed. This is for the reason that the seed is of such small diameter that the thresher is difficult to adjust to an optimum spacing.

I have discovered that if the upper surface of a concave is elastic, such as sheathed with rubber, that the yield afforded by the rubber surface tends to do two things. One, it permits some greater latitude than between two hard surfaces and, two, the action of the rasp is not purely cutting and abrading. The pods are caused to be dragged over the rubber surface and thus, the seeds are rubbed from the pods to some extent. My experience is that better threshing results with less injury to the seed to be separated from its pods when the latter are subjected to this compound rubbing-abrasion action.

The principal object of my invention is to produce a rasp-type thresher with a concave having a plurality of spaced resilient ribs defining pockets between them so that the grains, and particularly small grains, may be threshed effectively without damage to the grain to be separated.

A further object of my invention is to provide a concave of a threshing mechanism of this character with resilent ribs that may readily be bolted or otherwise secured to a standard concave, easily and quickly.

Further and other details of my invention are hereinafter described with reference to the accompanying drawings in which.

Figure 3:
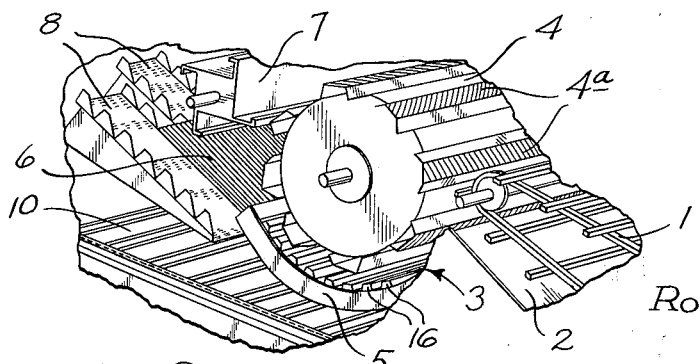
FIG. 3 is a fragmentary perspective of a threshing machine of the rasp-bar cylinder-type shown on a reduced scale with its concave and the mechanism associated therewith.

Referring first to FIG. 3: Grain being reaped flows through the machine from right to left. It has previously passed under a power-driven reel which feeds the grain and rolls it to a forward cutter bar. Thereafter, a continuous auger carries the grain from both ends of the platform to the center of the auger and fingers take the material and feed it positively to a feeder beater, where it is delivered to a feeder conveyer chain 1. Said chain delivers the grain in a steady stream upwardly over an inclined chute 2, as is shown in FIG. 3, to the space 3, between rasp-bar cylinder 4 and concave grate 5. At the discharge side of said space 3, that is the space to the left thereof as shown in FIG. 3, the grain passes over grate fingers 6 and against the wing-type separating beater 7. Said beater separates the straw from the cylinder 4 and deflects the grain through the grate fingers 6 and passes the straw onto the straw walkers 8. All of the foregoing defines the general type of machine with which my invention is concerned.

Figure 1:
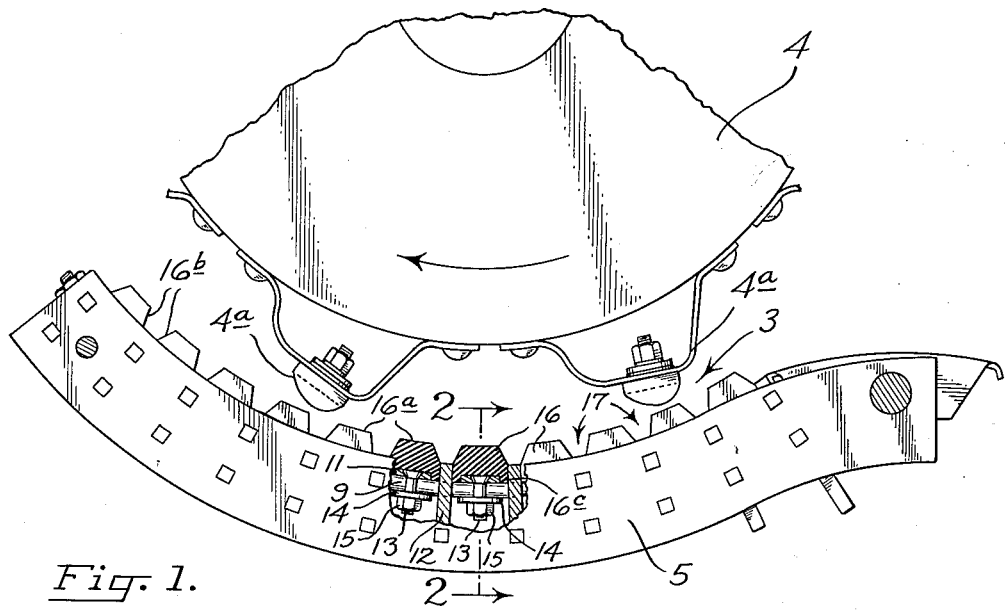
FIG. 1 is a fragmentary side elevation of a rasp-bar-type cylinder, shown in operating relation with its concave, provided with resilient ribs, in accordance with my invention.
Figure 2:
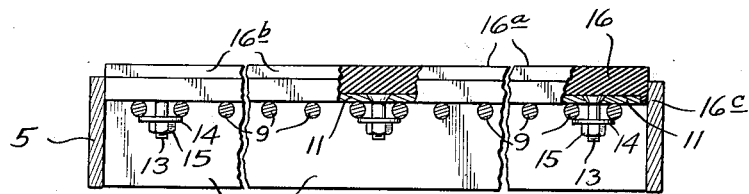
FIG. 2 is a transverse section through the concave and the ribs thereof taken on the line 2—2 in FIG. 1.

Next defining FIG. 1: In said type of thresher the concave grate 5 is apertured by means of cross rods 9, through which the separated or threshed grain normally passes and it is conveyed away by conveyer belt 10. I have modified said concave grate by interposing stiff transverse bars 11 between the radially disposed slats 12 in the concave grate. Said stiff bars 11 may be arranged in each of said spaces or in selected spaces depending upon the desired degree of threshing. The drawings show each of said spaces between slats substantially filled by a stiff bar 11.

Said stiff bars are bolted to the cross rods 9 by countersunk head bolts 13, extending through the stiff bars which, in turn, rest upon the cross rods. Said bars are locked to said cross rods by washers 14, which engage the underside of said cross rods, and locked by nuts 14. Thus, the stiff bars are secured transversely of the said cross rods.

Overlying said stiff bars 11 are rubber-like coatings 16 which in section are of truncated pyramidal form, as is shown most clearly in FIG. 1. That is, each of said coatings is substantially thick overlying the stiff bars approximately five-eighths of an inch to three-quarters of an inch. The upper faces 16a of the covering are approximately seven-eighths of an inch wide and the total over-all width of the coverings is about one inch and a quarter. The obliquely disposed sides of the rubber-like coverings or coatings slope at about a 30° angle from the upper faces 16a and thus, are about three-sixteenths of an inch wide. That is to say, the upper faces are approximately seven-eighths of an inch wide and the coverings having an over-all width of about an inch and a quarter. They are designed to fill substantially the entire spacing between the rigidly disposed slats of the concave grate.

Skirts 16c extend about the edges of the stiff bars 11 and lie below the sweep of the upper edges of said slats 12, as is shown most clearly in FIG. 1. Thus, the truncated pyramidal coverings extending above the concave grate sides take the appearance shown in FIG. 1 and fill substantially the entire space 3 between the upper edge of the concave grate and the lower edges of rasp-bars 4a carried by cylinder 4. A slight space, depending upon the size of the grain being threshed, remains between the peripheral portions of the rasp-bars and the upper faces of the coatings through which a stratum or ribbon of grain may pass. Due to such small spacing, said rasp-bars, in cooperation with the coated bars 11, produce a compound action of abrasion and rubbing as the cylinder rotates over the concave grate. Saying it another way, the coverings cover substantially the entire space between the concave grate and the path defined by the rasp-bars 4a leaving only a minor portion through which grain to be threshed may pass.

Between each of the covered bars 11 is a valley 17 running the entire length of the cylinder and its concave grate. Grain tends to fall into these valleys and to be swept therefrom over the left-hand edge of the grate by reason of the mechanical action of the rasp-bar cylinder and the blast of air which it produces. Said valleys and the width of the upper faces together tend to produce a slight pause or accumulation so that the rasp-bars not only may abrade the husks from the grain, but also may exercise a rubbing effect over the rubber-coated bars 11 to produce better separation without masceration of the grain being threshed.

As is shown in FIG. 3 the rasp-bars 4a have raised rasping sections resembling combs which are not parallel with the ends of the cylinder. They form partial helices and succeeding rasp-bar sections are inclined in opposite directions of rotation. This produces slight lateral movement of the grain pods over the concave grate as each succeeding rasp-bar moves thereover and thus, more effective masceration and rubbing of the pods to produce separation of the grain therefrom.

The rubber-coated stiff bars may readily be inserted and removed for repair, adjustment and for replacement when the rubber coverings become worn unduly. Also said rubber-covered bars 11 may be easily inserted in any standard rasp-bar cylinder type thresher without requiring the latter to be dismembered.

It is claimed and desired to secure through Letters Patent:

1. In a thresher, a concave including a curved base comprising a plurality of spaced stiff transverse bars spaced apart upon an arcuate sweep, a cylinder having mascerating and rubbing rasp-bars thereon, said cylinder being journalled for rotation within the sweep of said base, said transverse bars when in operative position being spaced a substantial radial distance from the sweep of the rasp-bar cylinder, elastic rubber-like coverings straddling the transverse bars of said base and occupying substantially all of the radial spacing between the rasp-bar cylinder and the transverse bars, said coverings having faces of substantial width lying substantially tangential to the path of rotation of the rasp-bars and being spaced circumferentially from adjacent faces, whereby grain being threshed may be compressed between the rasp-bars and thresher bars to rub and separate the surrounding pods without compressing and abrading the enclosed grains, unduly.

2. In a thresher, a concave including a curved base comprising a plurality of spaced stiff transverse bars spaced apart upon an arcuate sweep, a cylinder having mascerating and rubbing rasp-bars thereon, said cylinder being journalled for rotation within the sweep of said base, said transverse bars when in operative position being spaced a substantial radial distance from the sweep of the rasp-bar cylinder, elastic rubber-like coverings straddling the transverse bars of said base and occupying substantially all of the radial spacing between the rasp-bar cylinder and the transverse bars, said coverings having faces of substantial width lying substantially tangential to the path of rotation of the rasp-bars, said coverings being of truncated pyramidal section, whereby grain being threshed may be compressed between the rasp-bars and thresher bars to rub and separate the surrounding pods without compressing and abrading the enclosed grains, unduly.

3. In a thresher, a concave including a curved base comprising a plurality of spaced stiff transverse bars spaced apart upon an arcuate sweep, a cylinder having mascerating and rubbing rasp-bars thereon, said cylinder being journalled for rotation within the sweep of said base, said transverse bars when in operative position being spaced a substantial radial distance from the sweep of the rasp-bar cylinder, elastic rubber-like coverings straddling the transverse bars of said base and occupying substantially all of the radial spacing between the rasp-bar cylinder and the transverse bars, said coverings having faces of substantial width lying substantially tangential to the path of rotation of the rasp-bars, said coverings being of truncated pyramidal section, and having pendant skirts along each edge to sheath the underlying transverse bars, whereby grain being threshed may be compressed between the rasp-bars and thresher bars to rub and separate the surrounding pods without compressing and abrading the enclosed grains, unduly.

References Cited in the file of this patent

UNITED STATES PATENTS

| | | |
|---|---|---|
| 515 | Brooks | Dec. 15, 1837 |
| 2,303,200 | Dray | Nov. 24, 1942 |
| 2,327,901 | Johnson et al. | Aug. 24, 1943 |
| 2,403,638 | Clark | July 9, 1946 |
| 2,458,345 | Cass | Jan. 4, 1949 |

FOREIGN PATENTS

| | | |
|---|---|---|
| 14,324 | Great Britain | 1886 |